(12) United States Patent
Schroeder et al.

(10) Patent No.: US 6,751,556 B2
(45) Date of Patent: Jun. 15, 2004

(54) TECHNIQUE AND SYSTEM FOR MEASURING A CHARACTERISTIC IN A SUBTERRANEAN WELL

(75) Inventors: Robert J. Schroeder, Newtown, CT (US); Jeffrey Tarvin, Brookfield, CT (US); Rogerio T. Ramos, Chandlers Ford (GB); George A. Brown, Beaconsfield (GB)

(73) Assignee: Sensor Highway Limited, Southampton (GB)

( * ) Notice: Subject to any disclaimer, the term of this patent is extended or adjusted under 35 U.S.C. 154(b) by 0 days.

(21) Appl. No.: 10/317,556

(22) Filed: Dec. 12, 2002

(65) Prior Publication Data

US 2003/0236626 A1 Dec. 25, 2003

Related U.S. Application Data

(63) Continuation-in-part of application No. 10/176,858, filed on Jun. 21, 2002.

(51) Int. Cl.$^7$ .................................................. G01V 8/02
(52) U.S. Cl. ........................... 702/6; 702/12; 73/152.33
(58) Field of Search ........................... 702/6; 356/73.1; 374/138, 148; 250/256, 227.14; 73/152.21, 152.18, 152.33

(56) References Cited

U.S. PATENT DOCUMENTS

| | | | |
|---|---|---|---|
| 4,823,166 A | 4/1989 | Hartog et al. ................. 356/44 |
| 5,102,232 A | 4/1992 | Tanabe et al. ............... 374/131 |
| 5,380,995 A | 1/1995 | Udd et al. ................... 250/227 |
| 5,401,956 A | 3/1995 | Dunphy et al. ........ 250/227.18 |
| 5,592,282 A | 1/1997 | Hartog ........................ 356/44 |
| 5,825,804 A | 10/1998 | Sai .............................. 374/137 |
| 5,841,131 A | 11/1998 | Schroeder et al. ..... 250/227.17 |
| 6,072,567 A | 6/2000 | Sapack ........................ 356/32 |
| 6,218,661 B1 | 4/2001 | Schroeder et al. ..... 250/227.14 |
| 6,246,048 B1 | 6/2001 | Ramos et al. .......... 250/227.18 |
| RE37,283 E | 7/2001 | Kluth et al. .................. 385/12 |
| 6,268,911 B1 | 7/2001 | Tubel et al. .................. 356/72 |
| 6,271,766 B1 | 8/2001 | Didden et al. ........... 340/853.1 |
| 6,274,863 B1 * | 8/2001 | Kersey .................. 250/227.14 |
| 6,279,392 B1 | 8/2001 | Shahin, Jr. et al. ...... 73/152.52 |
| 6,279,660 B1 | 8/2001 | Hay ........................... 166/336 |
| 6,281,489 B1 | 8/2001 | Tubel et al. ........... 250/227.14 |
| 6,288,975 B1 * | 9/2001 | Frederick et al. ........... 367/149 |
| 6,302,203 B1 | 10/2001 | Rayssiguier et al. ... 166/250.01 |
| 6,304,686 B1 | 10/2001 | Yamate et al. ................ 385/13 |
| 6,305,227 B1 | 10/2001 | Wu et al. ..................... 73/705 |
| 6,351,987 B1 | 3/2002 | Winston et al. ............. 73/53.01 |
| 6,354,734 B1 | 3/2002 | Curran et al. ............... 374/148 |
| 6,442,304 B1 * | 8/2002 | Crawley et al. ............... 385/12 |
| 6,532,839 B1 * | 3/2003 | Kluth et al. ............... 73/866.5 |
| 6,601,671 B1 * | 8/2003 | Zhao et al. ................. 181/108 |
| 2001/0023614 A1 | 9/2001 | Tubel et al. .............. 73/152.39 |
| 2002/0007948 A1 | 1/2002 | Bayne et al. ................ 166/278 |

FOREIGN PATENT DOCUMENTS

| WO | WO 00/39548 | 7/2000 |
|---|---|---|
| WO | WO 02/39068 | 5/2002 |

OTHER PUBLICATIONS

Real–Time Monitoring and Control of Water Influx to a Horizontal Well Using Advanced Completion Equipped With Permanent Sensors, I.D. Bryant, et al., SPE 77522, Oct. 2002.

* cited by examiner

*Primary Examiner*—Donald McElheny, Jr.
(74) *Attorney, Agent, or Firm*—Wayne I. Kanak; Jaime A. Castaño; Jeffrey E. Griffin (57) ABSTRACT

A technique usable with a subterranean well includes deploying a first optical sensor downhole in the subterranean well. The technique includes observing an intensity of backscattered light from the first optical sensor to measure a distribution of a characteristic along a portion of the well. The technique includes deploying a second sensor downhole to measure the characteristic at discreet points within the portion. The second sensor is separate from this first sensor and includes at least one interferometric sensor.

50 Claims, 6 Drawing Sheets

TECHNIQUE AND SYSTEM FOR MEASURING A CHARACTERISTIC IN A SUBTERRANEAN WELL

This application is a continuation-in-part of U.S. patent application Ser. No. 10/176,858, filed on Jun. 21, 2002.

BACKGROUND

The invention generally relates to a technique and system for measuring temperature in a subterranean well.

It is often desirable to measure the temperature at several locations in a subterranean well. For example, temperature measurements may be used to observe the movement of an artificially-induced or naturally-occurring temperature region (a "cold spot" or a "hot spot") in a particular region in the well for purposes of determining a fluid velocity, or flow rate, in that region of the well. Temperature measurements from the well may be used for a variety of other purposes.

There are several different types of temperature measurement systems for use in subterranean wells. A distributed temperature sensor (DTS)-based temperature measurement system uses a sensor that can provide data that is spatially distributed over many thousands of individual measurement points inside the well. One such DTS is an optical fiber, an element whose optical properties are sensitive to its temperature.

When used as a sensor, the optical fiber is deployed downhole so that the optical fiber extends into the region where temperature measurements are to be made. As examples of possible deployment mechanisms, the optical fiber may be deployed downhole with the well casing string or deployed downhole in a conduit that may extend through the central passageway of the casing string.

As a more specific example of a DTS-based temperature measurement system, an optical time domain reflectometry (OTDR) technique may be used to detect the spatial distribution of temperature along the length of an optical fiber. More specifically, pursuant to the OTDR technique, temperature measurements may be made by introducing optical energy into the optical fiber by opto-electronics at the surface of the well. The optical energy that is introduced into the optical fiber produces backscattered light. The phrase "backscattered light" refers to the optical energy that returns at various points along the optical fiber back to the opto-electronics at the surface of the well. More specifically, in accordance with OTDR, a pulse of optical energy typically is introduced to the optical fiber at the well surface, and the resultant backscattered optical energy that returns from the fiber to the surface is observed as a function of time. The time at which the backscattered light propagates from the various points along the fiber to the surface is proportional to the distance along the fiber from which the backscattered light is received.

In a uniform optical fiber, the intensity of the backscattered light as observed from the surface of the well exhibits an exponential decay with time. Therefore, knowing the speed of light in the fiber yields the distances that the light has traveled along the fiber. Variations in the temperature show up as variations from a perfect exponential decay of intensity with distance. Thus, these variations are used to derive the distribution of temperature along the optical fiber.

In the frequency domain, the backscattered light includes the Rayleigh spectrum, the Brillouin spectrum and the Raman spectrum. The Raman spectrum is the most temperature sensitive with the intensity of the spectrum varying with temperature, although all three spectrums of the backscattered light contain temperature information. The Raman spectrum typically is observed to obtain a temperature distribution from the backscattered light.

Another technique that may be used in conjunction with a DTS-based temperature measurement system is an optical frequency domain reflectometry (OFDR) technique. As is known in the art, OFDR is not time domain based like the OTDR technique. Rather, OFDR is based on frequency.

Another type of temperature measurement system embeds gratings, called fiber Bragg gratings (FBGs), in an optical fiber for purposes of sensing downhole temperatures. An FBG-based temperature measurement system is described in, for example, U.S. Pat. No. 5,380,995. These Bragg gratings may also measure strain.

Figure 1:
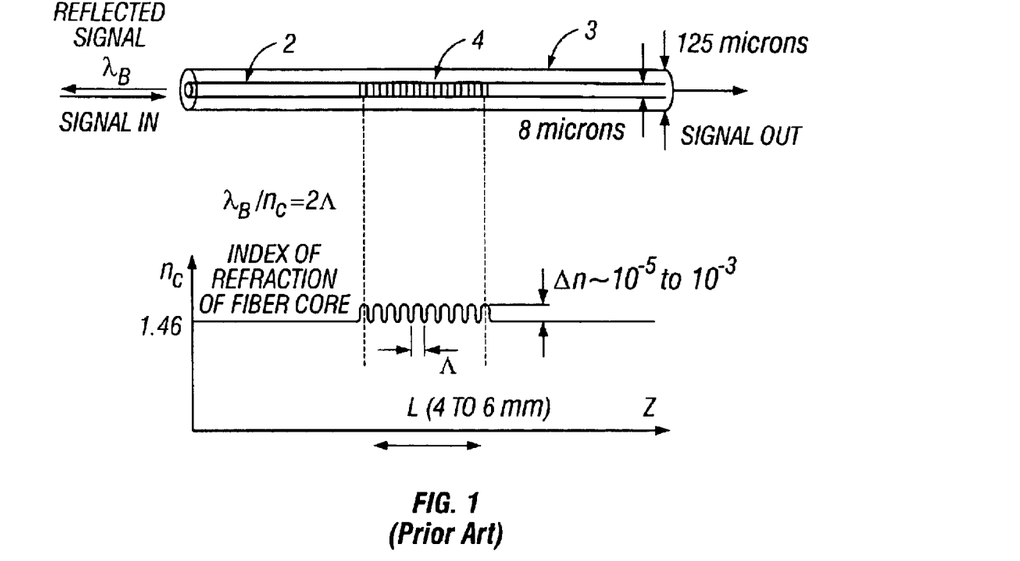
FIG. 1 is a schematic diagram of a fiber Bragg grating inside a single mode optical fiber of the prior art.

Fiber Bragg gratings are manufactured by a variety of methods inside the core of standard telecommunications grade single mode fiber. Referring to FIG. 1, a standard single mode fiber 1 includes an eight micron diameter core glass material 2 that is surrounded by a 125 micron cladding glass material 3, of a different index of refraction, that gives the fiber 1 its waveguide properties. A fiber Bragg grating 4 is photowritten onto the core material 2 by ultraviolet laser radiation and represents a 4–6 mm long periodic modulation in the core's index of refraction by approximately 0.01%.

This perturbation in the core yields a Bragg wavelength, $\lambda_B$, given by Bragg's law:

$$\lambda_B = 2\, n_c\, \Lambda, \qquad (1)$$

where $n_c$ is the effective core index of refraction and "$\Lambda$" is the period of the index modulation. The reflection peak, "$\lambda_B$," is linear with strain (called "$\epsilon$") and temperature (called "T") and is described by the following equation:

$$\frac{\Delta \lambda B}{\lambda B} = (1 + \xi)\Delta T + (1 - \rho_e)\varepsilon, \qquad \text{Eq. (2)}$$

where $\xi$ and $\rho_e$ are the thermal optics (dn/dT) coefficient and the photo elastic coefficient, respectively. Effectively a strain and temperature gauge inside an optical fiber, the FBG has demonstrated linear response down to nanostrain levels and up to 500 degrees Centigrade. During the manufacturing process, the period of modulation in the index of refraction can be adjusted to produce multiple FBGs on a single fiber each with a unique center Bragg wavelength, $\lambda_B$. The FBG-based system is therefore suitable for a multi-sensing system with a single optical fiber line because wavelength domain multiplexing (WDM) and time domain multiplexing (TDM) can be applied.

Figure 2:
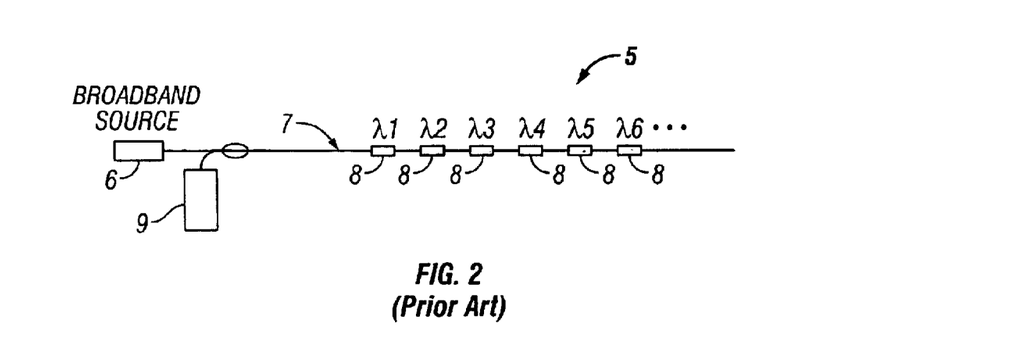
FIG. 2 is a schematic diagram of a Bragg grating sensor system of the prior art.

FIG. 2 depicts a conventional system 5 that uses FBGs. The system 5 includes an incoherent broadband light source 6 (with 50 nm bandwidth) that is inserted into a fiber optic cable 7 that has several FBG's 8 written onto it at different spatial locations. The system 5 also includes a detection subsystem 9. Each FBG 8 reflects a narrow band fraction (typically, 0.2 nanometers) of the broadband source light with a unique wavelength ($\lambda_1, \lambda_2, \ldots$) encoded tag. The FBG's may be a few millimeters or kilometers apart, but they will maintain the same wavelength separation. As each Bragg grating 8 is subjected to strain or temperature variations, the center Bragg wavelength will move to shorter or longer wavelengths, independently of the others, and it is this wavelength change that is measured by the demodulation detection system shown.

Figure 3:
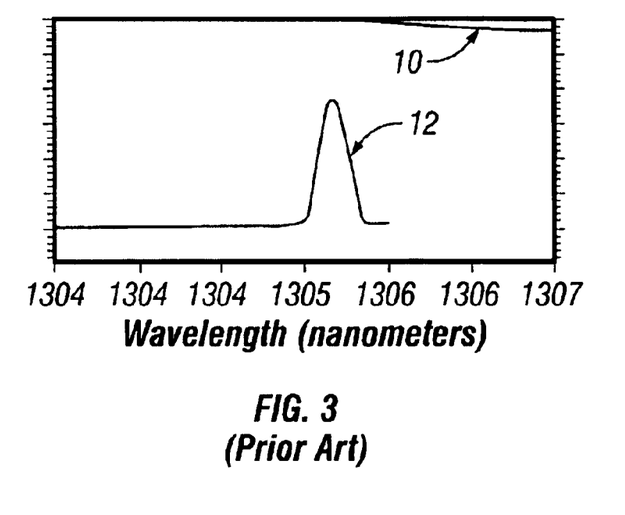
FIG. 3 is an illustration of a wavelength spectrum of a single Bragg grating of the prior art.
Figure 4:
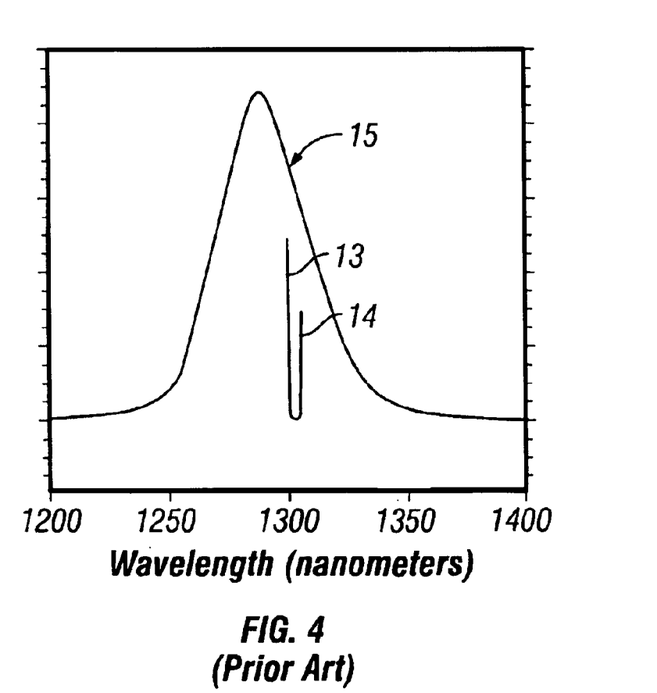
FIG. 4 is an illustration of the reflection spectrum of two wavelength separated Bragg gratings along with an LED light source spectrum of the prior art.

FIG. 3 shows a spectral waveform 12 of a single Bragg grating as a function of wavelength. Also depicted in FIG. 3 is a waveform 10 of the source light emitting diode (LED) 12. Typically, the demodulation system is attached via a fiber optic beamsplitter where a fraction of the returned light from the FBG is diverted from its return to the light source and into the demodulation system. FIG. 4 depicts the reflection response of two FBG's (depicted by spectral waveforms 13 and 14) when illuminated with a broadband light emitting diode (having a spectral waveform 15) in the near infrared band centered at 1300 nanometers. It will be understood by those skilled in the art that all the Bragg gratings in FIGS. 3 and 4 may have the same wavelength and the light source and demodulation system may operate in a time division multiplexing mode thereby identifying each FBG by light travel time in the fiber, rather than wavelength. The thermal sensitivity of each grating is still governed by equation 2. It is further understood that the thermal response of the grating may be enhanced mechanically by utilizing the strain response of a Bragg grating by coupling the FBG to a material with a large Coefficient of Thermal Expansion. A method for this is described in U.S. Pat. No. 6,246,048.

Other kinds of sensors to measure physical and chemical sensors include interferometric sensors and attenuation based sensors.

SUMMARY

In an embodiment of the invention, a technique that is usable in a subterranean well includes deploying a first sensor in a remote location to measure a distribution of a characteristic along a segment at the location. The technique includes deploying a second sensor downhole to measure the characteristic at discrete points within the segment. The second sensor is separate from the first sensor.

Advantages and other features of the invention will become apparent from the following description, drawings and claims.

DETAILED DESCRIPTION

Figure 5:
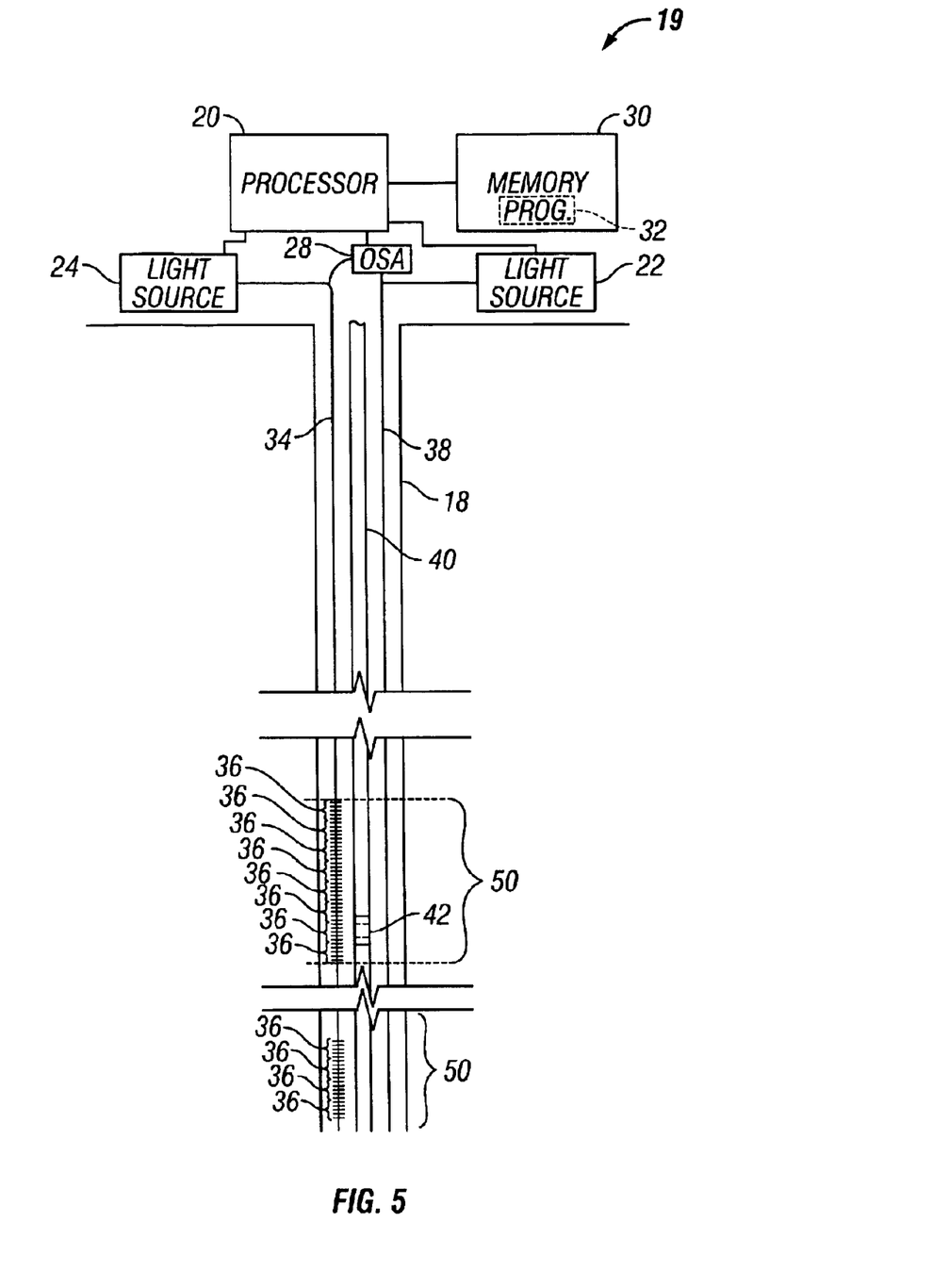
FIGS. 5, 6 and 9 are schematic diagrams of systems to measure the temperature inside a subterranean well according to different embodiments of the invention.

Referring to FIG. 5, in accordance with an embodiment of the invention, a temperature measurement system 19 for a subterranean well includes at least two types of temperature measurement subsystems, each of which is associated with a different and separate downhole temperature sensor. One of these temperature measurement subsystems may be a distributed temperature sensor (DTS)-based temperature measurement system that observes the intensity of backscattered light from an optical fiber 38 that extends into a wellbore 18 of the well. Another one of the temperature measurement subsystems may be a fiber Bragg grating (FBG)-based temperature measurement system that observes the spectral energy of light that is reflected from FBGs that are embedded in an optical fiber 34 that extends into the wellbore 18.

The installation of DTS-based temperature measurement systems within the oil industry has had significant acceptance. Unlike any combination of discrete electrical or fiber optic sensors, the DTS system produces a unique distributed measurement of temperature that cannot be achieved by any other technology. This application has been especially accelerated in permanent installations for vertical and deviated oil wells, where a single "snapshot" of the geothermal profile of the entire well length can be taken in a few minutes. The typical geothermal gradient is 3 to 6 degrees C. per 30 meters of depth.

In addition to measurements of the geothermal gradient, for production logging purposes, analysis of DTS results has replaced the traditional wireline temperature measurement for the location of open channels in cement behind casing, fluid entries in perforated wells and fluid front movement in steam-injected wells. These are typical production monitoring applications where the measurement precision of a typical DTS system, typically 0.5 degree C. but as low as 0.1 degree C. would be acceptable. Other production quantities, such as the temperature profile near an electrical submersible pump (ESP) to produce artificial lift, has had a great diagnostic benefit.

Near positions where the reservoir fluid enters the wellbore, very small thermal changes can occur over extended periods of time that can indicate fluid movement at a distance away from the wellbore. To determine this movement, it is generally agreed that a temperature measurement with a minimum 0.1 degree C. resolution and as low as millidegrees is required. The resolution afforded by a fiber optic temperature sensor based on FBG sensor element can achieve this level of measurement quality. Also, the spatial resolution from the FBG sensor element placement can be as low as millimeters. DTS systems typically give a true minimum spatial resolution of 1 meter.

The placement of an array of FBGs within a vertical or deviated well can be optimized to minimize sensor and deployment costs. When the natural temperature variation along a well is small, as in a horizontal well, high precision discrete sensors may be required to measure the temperature changes induced by produced fluids. However, cost or complexity may limit the number of discrete sensors, so that they are widely spaced or monitor only a small part of the well. In that case, a DTS system can monitor the rest of the well, to detect or quantify events that can cause larger changes in temperature, such as fluid arriving from a different vertical depth or fluids of different temperature injected into the formation by another well.

However, a Bragg array alone would not be able to cover the entire well from surface to the well bottom due to cost and technology limitations. For FBG technology to mimic a DTS system with 1-meter resolution for a 10 km well would require 10,000 Bragg sensor elements. An array of this size would be technologically challenging and perhaps very costly. Therefore the system 19 provides a way to measure both small and large temperature variations simultaneously.

In some embodiments of the invention, the system 19 delivers the thermal profile of the entire well, along with an optimized placement of highly precise and accurate sensor arrays in a specified zone of interest in the well.

There are several applications where the combination of a distributed measurement, such as temperature, can be intelligently combined with a optimized placement of discrete measurements (i.e. temperature) to produce a unique measurement of both large and small thermal changes important to the oil field specialist.

One application for the combination of a distributed and multi-point temperature array to provide coarse and fine resolutions for the measurement of temperature is in extended reach oil wells, i.e., wells that exceed 5 kilometers in length. Generally it is known that for DTS systems using multimode fiber, the resolution of the system decreases with the fiber distance from the DTS electronics. Although there are various ways to extend the range of the DTS system, the resolution at greater distances deviates from 0.1 degree C. significantly. Also, the DTS opto-electronics has typically a dynamic range of 20 dB. Using normal multimode fiber with attenuation per unit length of 2 dB/km, the maximum DTS range would be 10 km. Acquiring measurements beyond some range can become difficult due to lack of sufficient signal.

Bragg grating technology, which operates in a more favorable wavelength range where the attenuation per unit length is less than 0.5 dB/km and where the power return is significantly greater than from the Raman process, can produce 0.010 degree C. precision at distances to 20 km or greater. Generally, the most interesting location for high precision temperature measurements is at the farthest or most extended reach of the oil well.

It is therefore desired, for extended reach wells, to have a combined system that can give an inexpensive distributed temperature profile of the entire well up to the limit capable by a DTS-like system (e.g. Raman or Brillouin) followed by a well designed placement of a Bragg based temperature sensor array or arrays, in one or more zones, that can provide 1) a measurement and/or 2) better resolution and accuracy.

Generally, however, the combination of a distributed and multi-point temperature array to provide coarse and fine resolutions for the measurement of temperature may be used in any application requiring a higher degree of resolution and/or accuracy than provided by a stand-alone distributed temperature measurement. Another such application is the determination of fluid velocity as previously disclosed.

Turning now to a more specific discussion of the DTS-based temperature measurement system, in some embodiments of the invention, the DTS-based temperature measurement system uses an optical time domain reflectometry (OTDR) technique to measure a temperature distribution along a region (the entire length, for example) of the optical fiber 38. Thus, the optical fiber 38 forms at last part of a sensor to measure a distribution of a characteristic along a portion of the well. The DTS-based temperature measurement system is capable of providing a spatial distribution of thousands of temperatures measured in a region of the well along which the optical fiber 38 extends. It is noted that a DTS-based temperature measurement system other that OTDR, such as OFDR, may be used in other embodiments of the invention. In addition, a Brillouin spectrum-based DTS system may be used in some embodiments of the invention (instead of Raman). Alternatively, a Rayleigh spectrum-based DTS system may be used, etc.

As noted above, a potential shortcoming of the DTS-based temperature measurement system is that the temperature resolution and accuracy of the DTS temperature measurement system may be inadequate for some applications. For example, in some embodiments of the invention, the DTS temperature measurement system may be limited to a temperature resolution of about 0.1° Celsius (C.). This means that, in this scenario, the DTS temperature measurement system cannot be relied on to resolve temperature differences less than 0.1° C. This resolution limit, in turn, may affect the measurement of various well properties, such as (for example) the determination of a fluid velocity inside a particular zone in the well.

For example, it may be desirable to determine a fluid velocity in an exemplary zone 50 of interest that is depicted in FIG. 5. However, with the above-described resolution limitation of DTS temperature measurement system, the fluid velocity may not be able to be determined. As a more specific example, to measure the fluid velocity, a tubular member 40 may be inserted into the wellbore 18, and this tubular member 40 may extend into the zone 50. The tubular member 40 has ports 42 through which a temperature-altering fluid may be introduced into the zone 50 for purposes of creating a temperature pocket, or spot, in the zone 50. For example, via the tubular member 40, a relatively cool fluid may be introduced into the zone 50 for purposes of creating a cool spot in the zone 50. With the use of temperature measurements, the fluid velocity may be determined by observing the movement of this spot. However, the cool spot may be quite small, and may not be detectable due to the resolution constraints of the DTS-based temperature measurement system.

Not only may artificially-injected cool spots be introduced into the well for purposes of measuring fluid velocity, naturally-occurring cool spots may be observed in the well to determine a fluid velocity. However, these naturally-occurring cool spots typically are quite small and may not be detectable with the DTS-based temperature measurement system due to its resolution limits. The DTS-based temperature measurement system may also be inadequate to derive a flow velocity for flow velocity determinants techniques. For example, the tubular member 40 may alternatively include a heater coil for purposes of injecting a hot spot (instead of a cold spot) into the zone to accomplish the above-described temperature movement observation. Likewise, although a vertical wellbore 18 is depicted in FIG. 5, flow velocity may also be determined in a lateral, or generally horizontal, wellbore. In lateral wellbores, there is no naturally occurring large thermal differences through the wellbore. However, a small thermal anomaly may occur in the horizontal well in which a thermal region of a particular temperature may be observed moving laterally through the wellbore. These anomalies are also quite small and may present challenges when using a DTS-based temperature measurement system.

It has been discovered that an FBG-based temperature measurement system may be used in combination with the DTS-based temperature measurement system for purposes of enhancing the resolution of the temperature measurement. In this manner, the FBG-based measurement system may aid the DTS-based temperature measurement system for purposes of resolving small temperature differences and improving measurement accuracy, in some embodiments of the invention. The optical fiber 34 of the FBG-based temperature measurement system includes an array of fiber Bragg gratings (FBGs) 36, such as the FBGs 36 that are depicted inside the zone 50 of FIG. 1. Thus, the optical fiber 34 forms at least part of a sensor to measure a characteristic at discrete points with a portion of the well; and this sensor may include one or more FBGs 36.

In some embodiments of the invention, each FBG 36 provides one temperature measurement, and this temperature measurement has a resolution of about 10 millidegrees Celsius (m° C.), a resolution that may overcome the resolution limits of the above-described DTS-based temperature measurement system. A method to increase the fundamental thermal resolution of a FBG is described in U.S. Pat. No. 6,246,048 by utilizing the strain response of a Bragg grating by coupling the FBG to a material with a large Coefficient of Thermal Expansion.

In some embodiments of the invention, the DTS-based temperature measurement system may tend to lose resolution over greater lengths (above 7 kilometers (km), for example), whereas the FBG-based measurement system may suffer little degradation in temperature readings for lengths of 20 km or more. The FBG-based temperature measurement system, in some embodiments of the invention, may provide temperature measurements in the order of seconds, as compared to the temperature distribution from the DTS-based temperature measurement system that may take in the order of minutes.

As depicted in FIG. 5, the array may include several FBGs 36 that are spaced over a particular zone of interest, such as the zone 50. Each FBG 36 provides a temperature measurement. Each FBG 36 reflects at a Bragg wavelength, L, and the wavelengths that the FBG 36 reflects is a function of the effective core index of refraction, $n_c$ and the period of the index modulation, L of the FBG 36 as described by Eq 1. Therefore, temperature affects the wavelength location of the spectral band of energy that is reflected by the FBG 36. Thus, a temperature may be measured via a particular FBG 36 by introducing optical energy (into the optical fiber 34) that has wavelengths that include the possible wavelengths of the reflected spectral band. The wavelengths of the reflected spectral band are then observed to derive a temperature measurement at the location of the FBG 36 as described by Eq 2. In some embodiments of the invention, each FBG may have a different grating spacing or wavelength $l_c$ for purposes of distinguishing one FBG-based measurement from another. In another embodiment of the invention, each FBG may have the same grating spacing or wavelength $l_c$ and the array of FBG 36 is distinguished via time. Other FBG interrogations electronics or combinations of interrogation methods are possible and not excluded by this invention. In one embodiment, more than one FBG array 36 may be incorporated at different zones of interest along the optical fiber 34.

A potential shortcoming of the FBG-based temperature measurement system is that the system FBG provides a limited number of discrete temperature measurements, as compared to the thousands of spatially distributed temperature measurements that are provided by a DTS-based temperature measurement system. Furthermore, each FBG may be relatively expensive to make on a per unit length of fiber basis. However, unlike the DTS system that provides a distributed temperature measurement along the entire length of the optical fiber 38, in the FBG temperature measurement system, the FBG 36 are located only in certain zones of interest along the optical fiber 34.

Therefore, the DTS-based measurement system may be used to obtain temperature measurements outside of regions in which the FBG arrays 36 of the optical fiber 34 are located. In this manner, in some embodiments of the invention, the FBG arrays 36 may be used to obtain discrete, higher resolution measurements in a particular zone of the well, and the optical fiber 38 may be used to obtain spatially distributed, lower resolution measurements outside of these zones. Thus, the measurements from both temperature measurement systems may be selectively combined to yield a spatially distributed set of temperature measurements that have high resolution where desired.

In some embodiments of the invention, the FBG-based temperature system may provide more accurate temperature measurements than the measurements that are provided by the DTS-based temperature measurement system. Thus, in some embodiments of the invention, the measurements from these two temperature measurement systems may be combined for purposes of increasing the accuracy of temperature measurements from a particular zone, such as the zone 50. As an example, to increase the accuracy of the temperature measurements, the measurements derived from the DTS temperature measurement system along a particular region of the wellbore may be combined with the measurements derived from the FBG-based temperature measurement system along the same region. For instance, the FBG measurements may be used to correct any discrepancies in the DTS measurements for the given interval. As previously disclosed, the FBG system has a higher accuracy than the DTS system. At the same spatial location, the difference between the FBG measurement and the DTS measurement may be applied to the DTS measurements to correct any discrepancy in the DTS measurement. This and other examples of similar methods are in U.S. patent application Ser. No. 10/176,858 filed on Jun. 21, 2002, the parent application hereof which is incorporated herein by reference.

Referring now to a more specific configuration of the system 19, in some embodiments of the invention, a processor (a microprocessor, for example) 20 may execute a program 32 that is stored in a memory 30 for purposes of performing the FBG and DTS based temperature measurements. In this manner, the processor 20 may control a demodulation system (spectrum analyzer for example) 28 and two wavelength-tunable light sources 22 and 24. The system 19 may also include other optical components not shown in FIG. 5. For example, for each optical fiber 34, 38 the system 19 may include a directional coupler and optical filtering subsystem. Other variations are possible. As an example, in some embodiments of the invention, the system 19 may include a single light source (instead of two) that is multiplexed between the optical fibers 34 and 38.

For purposes of performing a DTS temperature measurement, the processor 20 may control the light source 22 so that the light source 22 emits pulses of light at a predefined wavelength (a Stokes wavelength, for example) into the optical fiber 38. In response to the pulses of light, backscattered light is produced by the optical fiber 38, and this backscattered light returns to the spectrum analyzer 28. The demodulation system 28, in turn, measures the intensity of the resultant backscattered light at the predefined wavelength. Using OTDR techniques, the processor 20 processes the intensities that are detected by the optical spectrum analyzer 28 to calculate the temperature distribution along some portion (the entire length, for example) of the optical fiber 38.

The processor 20 also operates the light source 24 to introduce optical energy into the optical fiber 34 at the appropriate frequencies/wavelengths. The processor 20, via the demodulation system 28, uses the array of FBGs 36 to obtain temperature measurements at discrete points, each of which is associated with a particular FBG 36. The spatial locations of the FBGs 36 may be distinguishable, in some embodiments of the invention, by the different wavelength or time delay that is associated with each FBG 36. The FBGs 36 are installed in a strain free manner, and they may be mechanically enhanced for better temperature resolution. The FBGs may be interrogated in a variety and combination of ways, such as wavelength division multiplexing (WDM), time division multiplexing (TDM), or systems to interrogate a series of weak or low reflectivity Bragg gratings with a reference interferometer as described in U.S. Pat. No. 5,798, 521 and developed by the US space agency NASA.

In some embodiments of the invention, both sensors 34 and 38 are deployed in control conduits that may be clamped to a tubular string (such as the tubular member 40) or located outside of the casing string 18.

Figure 6:
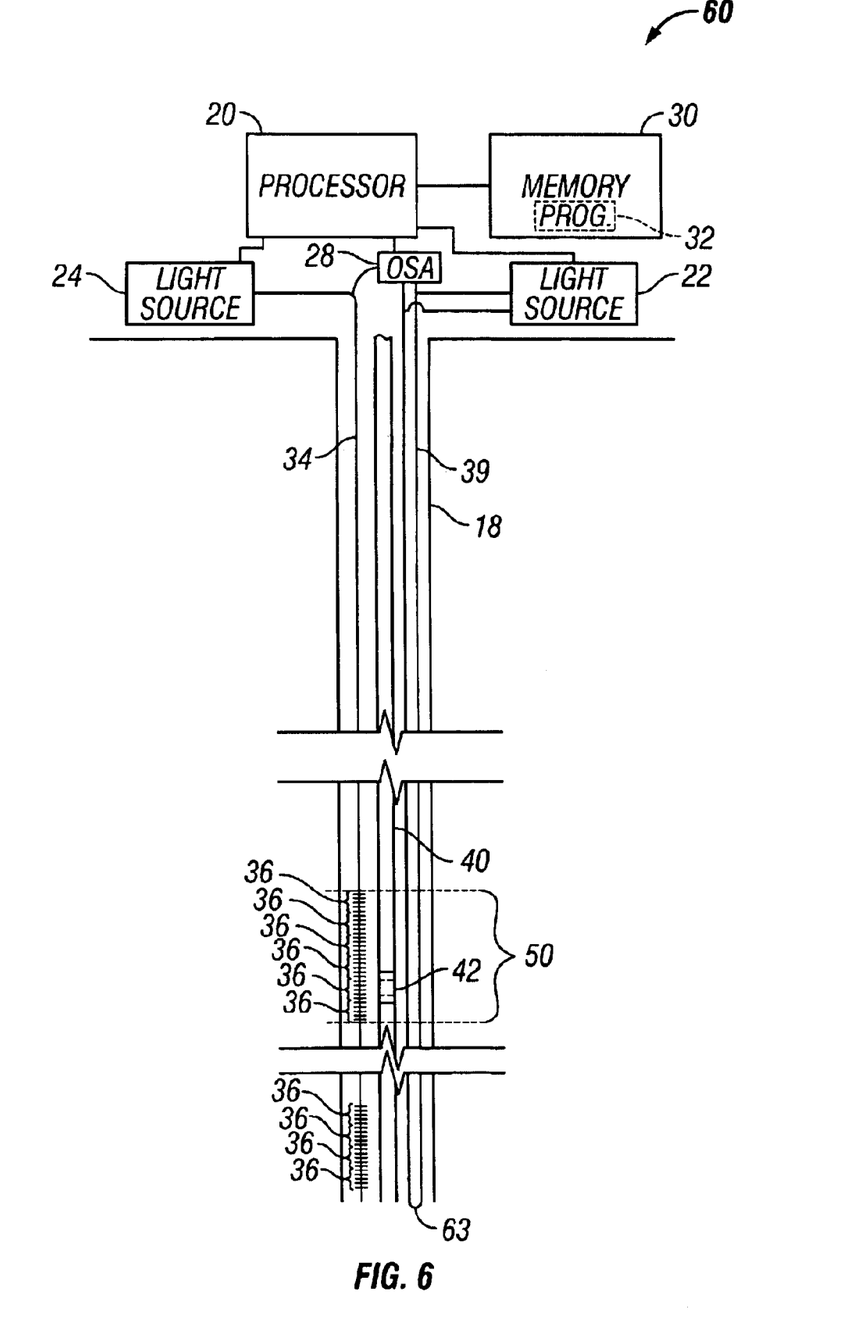

Referring to FIG. 6, in some embodiments of the invention, the system 19 may be replaced by the system 60. The two systems 10 and 60 are similar, except that the single-ended optical fiber 38 of FIG. 1 is replaced by a U-shaped, double-ended optical fiber 39. In this manner, the U-shaped optical fiber 39 extends along the length of the wellbore 18 and returns at its bottom point 63 to the surface of the well so that the two ends of the fiber 39 are present at the surface of the well. This arrangement may be particularly desirable due to the resultant increase in accuracy. In this manner, the optical fiber 39 provides two sets of measurements that may be combined together to improve the accuracy of DTS measurements from the optical fiber 39. Furthermore, should one of the strands become damaged, the remaining strand may be used in a single-ended mode.

Figure 7:
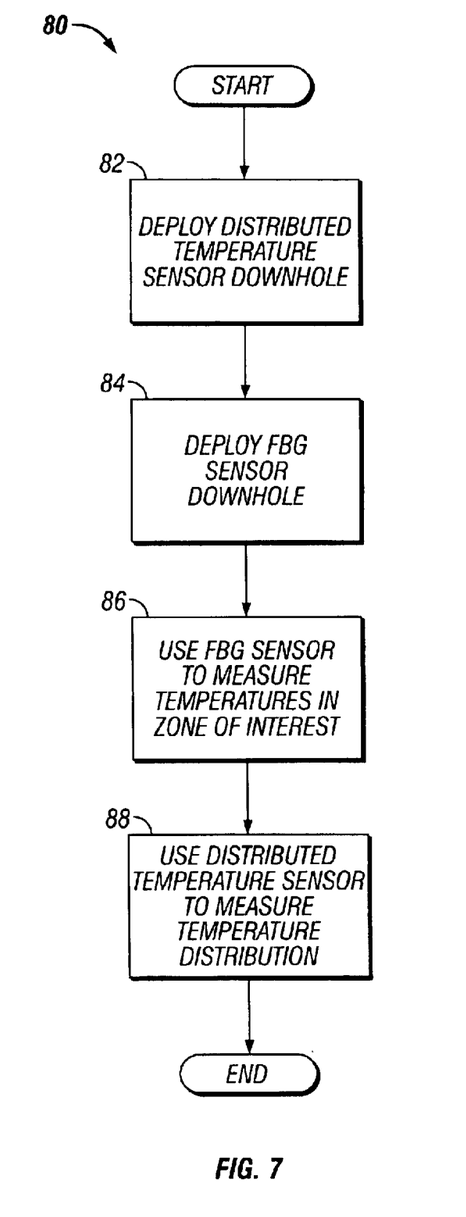
FIG. 7 is a flow diagram depicting a technique to measure temperature inside a subterranean well according to an embodiment of the invention.

Referring to FIG. 7, in some embodiments of the invention, a technique 80 may be used for purposes of integrating the temperature measurements provided by both temperature measurement subsystems to enhance the accuracy/resolution of these measurements. More specifically, in some embodiments of the invention, in the technique 80, the DTS (i.e., the optical fiber 38) is deployed downhole, as depicted in block 82. Also, the FBG-based sensor (i.e., the optical fiber 34 having the embedded FBGs 36) is deployed downhole in the zone 50 or zones 50, as depicted in block 84. As described above, the FBG-based sensor may be used to measure temperatures at discrete points in the zone 50 or zones 50, and the DTS may be used to measure a temperature distribution inside and outside of the zone 50. As also described above, the discrete temperature measurements provided by the FBG-based temperature measurements generally provide higher resolution and more accurate readings in the zone 50. Thus, for purposes of increasing the accuracy of temperature measurements from the zone 50, the processor 20 may combine both sets of measurements together. For purposes of resolving small temperatures (i.e., temperatures less than 0.1° C.), the processor 20 may, for the zone 50, use only the measurements that are provided by the FBGs 36 and use the temperature measurements provided by the DTS outside of the zone 50. To perform the temperature measurements, averaging and selective substitution of the temperature measurements, the processor 20 may execute a program such as the program 36 (stored in the memory 30).

Figure 8:
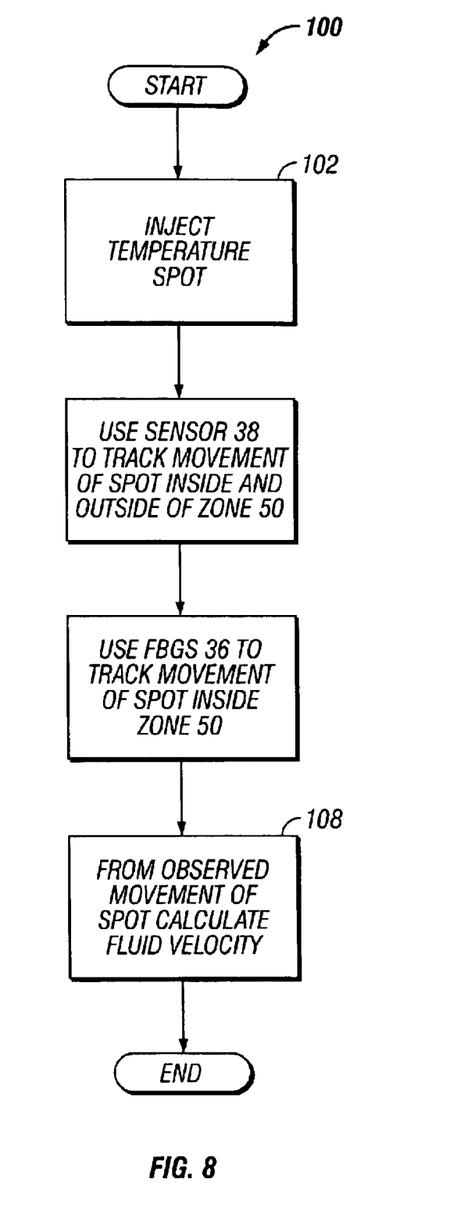
FIG. 8 is a flow diagram depicting a technique to measure a flow velocity in a subterranean well according to an embodiment of the invention.

Referring to FIG. 8, in some embodiments of the invention, a technique 100 may be used for purposes of performing a technique 100 to determine a flow velocity inside the zone 50. In this manner, in the technique 100, a thermal, or temperature, spot is injected (block 102) into a particular zone, such as the zone 50 (FIG. 5). This temperature spot has a temperature that is different from the overall temperature of the zone so that the temperature spot may be detected. Alternatively, the movement of a naturally-occurring temperature spot or an artificially-injected temperature spot may be observed in the zone 50. Thus, the DTS-based temperature measurement system may be used to track the temperature spot inside and outside of the zone 50, as depicted in block 104, and the FBG-based temperature measurement system may be used to track movement of the spot inside the zone 50, as depicted in block 106. From this observed movement of the spot, the processor 20 (FIG. 5) may then calculate (block 108) the flow velocity in a particular of the well, such as in the zone 50.

Figure 9:
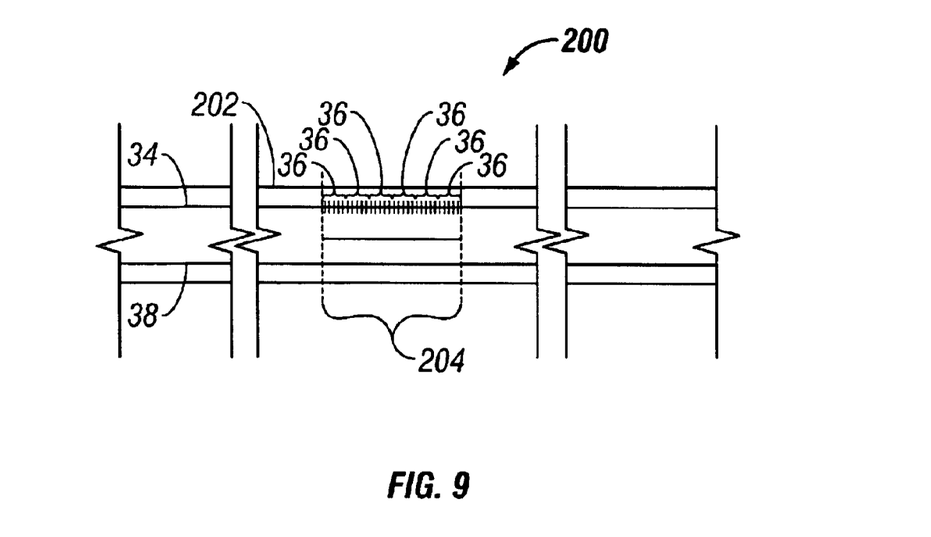

Although a vertical wellbore 18 is depicted in FIG. 8, the above-described temperature measurement techniques may be used in lateral wellbores. For example, FIG. 9 depicts a system 200 for use in a lateral wellbore 202. In this system, the optical fiber 38 that is part of the DTS-based temperature measurement system and extends into the lateral wellbore 202, including a zone 204 of interest of the wellbore 202; and the optical fiber 34 that is part of the FBG-based temperature measurement system extends into the wellbore 202, including the zone 204. For purposes of enhancing the resolution of temperature measurements, the optical fiber 38 may be used for purposes of obtaining temperature measurements outside of the zone 204; and inside the zone 204, the optical fiber 34 with its FBGs 36 may be used for purposes of obtaining higher resolution temperature measurements. For purposes of enhancing the accuracy of temperature measurements, both optical fibers 34 and 38 may be used for purposes of obtaining temperature measurements inside and outside of the zone 204; and these measurements may be combined together. Other variations are possible. For example, the single-ended fiber 38 depicted in FIG. 5 may be replaced by a double-ended fiber, in some embodiments of the invention.

Other embodiments are within the scope of the following claims. For example, in some embodiments of the invention, one or both of the sensors, such as the sensor 38 and/or sensor 34 may be pumped downhole with a fluid for purposes of running the sensor 38 and/or sensor 34 downhole. As a more specific example, a conduit may be run downhole, and fluid may be pumped through the passageway of the conduit. At surface of the well, the lower end of the sensor 38 may be introduced into the fluid flow and for purposes of permitting the fluid flow to unwind the sensor 38 and/or sensor 34 from a spool at the surface of the well to carry the sensor 38 downhole.

As another example of another embodiment of the invention, the system 19 may be used in environments other than in a subterranean well. For example, in some embodiments of the invention, the system 19 may be used to measure temperature along a segment (a pipe, for example) of a remote location. For example, the system 18 may be used in conjunction with power cables or pipelines. As further examples, this remote location may include chemical processing equipment of a chemical plant (for example) or food processing equipment of a food processing/preparation plant (for example). Other remote locations are possible.

In some embodiments of the invention, the system 19 may measure a characteristic other than temperature. For example, in some embodiments of the invention, the DTS-based measurement may measure a distribution of stress, and the FBG-based measurement system may measure the stress at specific points. Characteristics other than temperature and/or stress may be measured, in other embodiments of the invention.

In some embodiments of the invention, the zone 50 may include part of a formation, an entire formation, several formations, etc.

In some embodiments of the invention, the DTS-based and FBG-based measurement systems may be used to obtain production as well as reservoir information from the wellbore. Typically, DTS is used only to obtain production data (data from the flowing fluid). FBGs, which give much better resolution, can be used to obtain reservoir data (data about the fluids while they are still in the reservoir).

Figure 10:
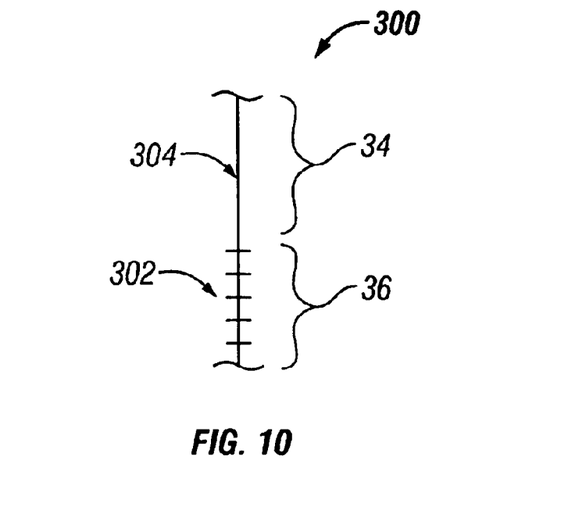
FIG. 10 is a schematic diagram of a single mode optical fiber according to an embodiment of the invention.

As yet another example, in some embodiments of the invention, both sensors 34 and 38 may be formed from a single, single mode optical fiber 300 that is depicted in FIG. 10. In some embodiments of the invention, if a particular FBG array 302 is located at the bottom of the fiber 300, the FBG array 300 may be attached via an adhesive to a bottom segment 304 of the optical sensor 34. Thus, in the context of this application, the sensors 34 and 38 are deemed as being formed from a single optical fiber shared in common even if the sensors 34 and 38 are formed from different optical fiber segments that are concatenated to form the single optical fibers. Incorporating both FBG-based and DTS-based measurements into the same optical fiber is possible because the FBG-based measurements may be wavelength selective (as an example), and the DTS-based measurements may be time multiplexed (as an example). One benefit of using a single fiber for both sensors 34, 38 is that correlation between separate fibers would not be necessary, which may be the case if each sensor 34, 38 is part of a separate fiber.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method usable with a subterranean well, comprising:
   deploying a first optical sensor downhole in a remote location;
   observing an intensity of backscattered light from the first optical sensor to measure a distribution of a characteristic along a segment of the remote location; and
   deploying a second optical sensor downhole to measure the characteristic at discrete points within the segment, the second sensor being separate from the first optical sensor and comprising at least one interferometric sensor.

2. The method of claim 1, wherein the first optical sensor comprises a distributed temperature sensor and the second optical sensor comprises at least one fiber Bragg grating.

3. The method of claim 1, wherein the characteristic comprises at least one of a stress and a temperature.

4. The method of claim 1, wherein the first optical sensor comprises an optical fiber.

5. The method of claim 1, wherein the second optical sensor comprises at least one Bragg grating.

6. The method of claim 1, further comprising:
   using optical time domain reflectometry to measure the distribution of the characteristic using the first optical sensor.

7. The method of claim 1, further comprising:
   selectively combining the measurements from the first and second optical sensors to enhance a measurement temperature resolution.

8. The method of claim 1, further comprising:
   using the second optical sensor to enhance an accuracy provided by the first optical sensor.

9. The method of claim 1, further comprising:
   using the first and second optical sensors to measure movement of a temperature spot.

10. The method of claim 1, wherein the first optical sensor comprises a single-ended optical fiber.

11. The method of claim 1, wherein the first optical sensor comprises a double-ended optical fiber.

12. The method of claim 1, wherein the first optical sensor is associated with an intensity-based temperature measurement system; and
   the second optical sensor is associated with a frequency-based temperature measurement system.

13. The method of claim 1, wherein the first optical sensor and the second optical sensor are formed from an optical fiber shared in common by both the first optical sensor and the second optical sensor.

14. A system usable with a subterranean well, comprising:
   a first optical sensor to measure a distribution of a characteristic along a portion of the well, the first optical sensor adapted to reflect incident light so that an intensity of backscattered light is observed to measure the characteristic; and
   a second optical sensor extending downhole to measure the characteristic at discrete points within the portion, the second optical sensor being separate from the first optical sensor and comprising at least one interferometric sensor.

15. The system of claim 14, wherein the first optical sensor comprises a distributed temperature sensor and the second optical sensor comprises at least one fiber Bragg grating.

16. The system of claim 14, wherein the measurement by the second optical sensor has a higher resolution than the measurement by the first optical sensor.

17. The system of claim 14, wherein the characteristic comprises at least one of a stress and a temperature.

18. The system of claim 14, wherein the second optical sensor comprises an optical fiber comprising at least one Bragg grating.

19. The system of claim 14, wherein the first optical sensor comprises an optical fiber, the system further comprising:
   a light source to generate light pulses downhole into the optical fiber; and
   an analyzer to analyze the spectrum of backscattered light produced by the light pulses to derive the distribution.

20. The system of claim 14, further comprising:
   a processor to selectively combine the measurements from the first and second optical sensors to enhance a measurement resolution.

21. The system of claim 14, wherein the first optical sensor comprises an optical fiber.

22. The system of claim 14, wherein the first optical sensor comprises a single-ended optical fiber.

23. The system of claim 14, wherein the first optical sensor comprises a double-ended optical fiber.

24. The system of claim 14, wherein
   the first optical sensor is associated with an intensity-based temperature measurement system, and
   the second optical sensor is associated with a frequency-based temperature measurement system.

25. The system of claim 14, wherein the first optical sensor and the second optical sensor are formed from an optical fiber shared in common by both the first optical sensor and the second optical sensor.

26. A method comprising:
   deploying a first optical sensor in a remote location;
   observing an intensity of backscattered light from the first optical sensor to measure a distribution of a characteristic along a segment of the remote location; and deploying a second optical sensor in the remote location to measure the characteristic at discrete points within the segment, the second optical sensor being separate from the first optical sensor and comprising at least one interferometric sensor.

27. The method of claim 26, wherein the remote location comprises one of the following:

food processing equipment; chemical processing equipment, a subterranean well, a power cable, and a pipeline.

28. The method of claim 26, wherein the characteristic comprises at least one of a temperature and a stress.

29. The method of claim 26, wherein the first optical sensor comprises an optical fiber.

30. The method of claim 26, wherein the second optical sensor comprises an optical fiber comprising at least one Bragg grating.

31. The method of claim 26, further comprising:

using optical time domain reflectometry to measure the distribution of the characteristic using the first optical sensor.

32. The method of claim 26, further comprising:

selectively combining the measurements from the first and second optical sensors to enhance a measurement temperature resolution.

33. The method of claim 26, further comprising:

using the second optical sensor to enhance an accuracy provided by the first optical sensor.

34. The method of claim 26, further comprising:

using the first and second optical sensors to measure movement of a temperature spot.

35. The method of claim 26, wherein the first optical sensor comprises a single-ended optical fiber.

36. The method of claim 26, wherein the first optical sensor comprises a double-ended optical fiber.

37. The method of claim 26, wherein the first optical sensor is associated with an intensity-based temperature measurement system; and the second optical sensor is associated with a frequency-based temperature measurement system.

38. The method of claim 26, wherein the first optical sensor and the second optical sensor are formed from an optical fiber shared in common by both the first optical sensor and the second optical sensor.

39. A system comprising:

a first optical sensor located at a remote segment to measure a distribution of a characteristic along a segment at the remote location; and a second optical sensor extending downhole to measure the characteristic at discrete points within the segment, the second sensor being separate from the first optical sensor and comprising at least one interferometric sensor.

40. The system of claim 39, wherein the characteristic comprises at least one of a stress and a temperature.

41. The system of claim 39, wherein the remote location comprises one of the following:

food processing equipment; chemical processing equipment, a subterranean well, a power cable and a pipeline.

42. The system of claim 39, wherein the second optical sensor comprises an optical fiber comprising at least one Bragg grating.

43. The system of claim 39, wherein the first optical sensor comprises an optical fiber, the system further comprising:

a light source to generate light pulses into the optical fiber; and analyzer to analyze the spectrum of backscattered light produced by the light pulses to derive the distribution.

44. The system of claim 39, further comprising:

a processor to selectively combine the measurements from the first and second optical sensors to enhance a measurement resolution.

45. The system of claim 39, further comprising:

a processor to combine the measurements from the first and optical sensors to enhance a measurement accuracy.

46. The system of claim 39, wherein the first optical sensor comprises an optical fiber.

47. The system of claim 39, wherein the first optical sensor comprises a single-ended optical fiber.

48. The system of claim 39, wherein the first optical sensor comprises a double-ended optical fiber.

49. The system of claim 39, wherein the first optical sensor is associated with an intensity-based temperature measurement system, and the second optical sensor is associated with a frequency-based temperature measurement system.

50. The system of claim 39, wherein the first optical sensor and the second optical sensor are formed from an optical fiber shared in common by both the first optical sensor and the second optical sensor.

* * * * *